(12) United States Patent
Yaguchi et al.

(10) Patent No.: US 7,458,216 B2
(45) Date of Patent: Dec. 2, 2008

(54) EXHAUST HEAT RECOVERY APPARATUS

(75) Inventors: Hiroshi Yaguchi, Susono (JP); Daisaku Sawada, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 220 days.

(21) Appl. No.: 11/346,204

(22) Filed: Feb. 3, 2006

(65) Prior Publication Data

US 2006/0123779 A1    Jun. 15, 2006

Related U.S. Application Data

(63) Continuation of application No. PCT/JP2004/013952, filed on Sep. 24, 2004.

(30) Foreign Application Priority Data

Oct. 1, 2003    (JP)    ............... 2003-343417

(51) Int. Cl.
*F02G 3/00*    (2006.01)
(52) U.S. Cl. ............... 60/616; 60/620; 60/517
(58) Field of Classification Search ............... 60/616, 60/620, 517–526
See application file for complete search history.

(56) References Cited

U.S. PATENT DOCUMENTS

| | | | |
|---|---|---|---|
| 3,845,624 A | 11/1974 | Roos | |
| 4,255,929 A | 3/1981 | McDougal | |
| 4,760,698 A * | 8/1988 | Bartolini et al. | ............... 60/526 |
| 4,794,752 A * | 1/1989 | Redderson | ............... 60/531 |
| 5,317,874 A | 6/1994 | Penswick et al. | |
| 5,417,066 A | 5/1995 | Kawano et al. | |
| 5,857,436 A | 1/1999 | Chen | |
| 5,934,076 A * | 8/1999 | Coney | ............... 60/617 |
| 6,543,229 B2 | 4/2003 | Johansson | |
| 7,181,912 B2 * | 2/2007 | Mori | ............... 60/616 |

FOREIGN PATENT DOCUMENTS

| | | |
|---|---|---|
| DE | 41 37 756 A1 | 5/1993 |
| FR | 1.010.210 | 6/1952 |
| JP | A 49-97139 | 9/1974 |
| JP | A 58-192951 | 11/1983 |
| JP | U 4-89836 | 8/1992 |
| JP | A 8-93547 | 4/1996 |
| JP | A 2001-99003 | 4/2001 |
| JP | 2002-266701 | * 9/2002 |

* cited by examiner

*Primary Examiner*—Hoang M Nguyen
(74) *Attorney, Agent, or Firm*—Oliff & Berridge, PLC

(57) ABSTRACT

An exhaust heat recovery apparatus (functioning as a Stirling engine), which is installed in, for example, an exhaust passage of an internal combustion engine and an exhaust passage of factory exhaust heat as restraining reduction in exhaust heat recovery efficiency, is installed in a device installing surface formed in the heat medium passage so that the device installing surface and a heater connecting side end surface of a high temperature side cylinder become parallel and the device installing surface and a cooler connecting side end surface of a low temperature side cylinder become parallel. The high temperature side cylinder is arranged at an upstream side of a direction of exhaust flow. The low temperature side cylinder is arranged at a downstream side of the high temperature side cylinder.

27 Claims, 11 Drawing Sheets

EXHAUST HEAT RECOVERY APPARATUS

This is a Continuation of Application No. PCT/JP2004/013952 filed Sep. 24, 2004, which claims the benefit of Japanese Patent Application No. 2003-343417 filed Oct. 1, 2003. The entire disclosure of the prior application is hereby incorporated by reference herein in its entirety.

BACKGROUND OF THE INVENTION

1. Field of the Invention

The present invention relates to an exhaust heat recovery apparatus, and more particularly to the exhaust heat recovery apparatus which can be installed in, for example, an exhaust passage of an internal combustion engine and an exhaust passage of factory exhaust heat as restraining reduction in exhaust heat recovery efficiency.

2. Description of the Related Art

Recently, in order to recover the exhaust heat of the internal combustion engine mounted on vehicles such as a passenger car, bus, and truck and the factory exhaust heat, Stirling engine with excellent theoretical thermal efficiency has received attention. Japanese Utility Model Application Laid-Open No. H4-89836 discloses a V-type Stirling engine capable of sufficiently maintaining engine performance as minimizing the void volume of the engine and also reducing a welding area of a heat exchanger tube to a great extent.

In the heat recovery of the Stirling engine, a heater needs to be efficiently heated by the exhaust heat, and working fluid with small temperature distribution needs to be introduced in a cylinder. Yet, depending upon how the Stirling engine is installed in the exhaust passage of the internal combustion engine and the exhaust passage of the factory exhaust heat, the heater (heating portion) and cooler (cooling device) cannot often be set effectively, which sometime results in reduction of the exhaust heat recovery efficiency. However, Japanese Utility Model Application Laid-Open No. H4-89836 does not disclose a specific structure for the installation of the Stirling engine in the internal combustion engine.

The present invention achieves in order to solve the above problems. It is an object of this invention to provide an exhaust heat recovery apparatus which can be installed in, for example, the exhaust passage of the internal combustion engine and the exhaust passage of factory exhaust heat as restraining reduction in exhaust heat recovery efficiency.

SUMMARY OF THE INVENTION

To achieve the object, an exhaust heat recovery apparatus according to the present invention includes a first cylinder; a second cylinder; a first piston and a second piston, which make reciprocating motions in the first cylinder and the second cylinder; a heat exchanger including a heater connected to the first cylinder, a regenerator connected to the heater, and a cooler connected to the regenerator and the second cylinder; and a crank shaft connected to the first piston and the second piston with a connecting rod, and converting reciprocating motion into rotational motion, wherein the exhaust heat recovery apparatus is installed in a heat medium passage so that the heater is arranged in the heat medium passage which has a device installing surface and through which a heat medium passes, and that the device installing surface and a heater connecting end surface of the first cylinder become parallel and the device installing surface and the cooler connecting side end surface of the second cylinder become parallel.

This exhaust heat recovery apparatus is installed in a heat medium passage so that a device installing surface formed in the heat medium passage is in parallel to a heater connecting side end surface and a cooler connecting side end surface of a cylinder. Due to the above-described structure, the pipe lengths of the cooler become the same and the pipe lengths of the regenerator become the same, thereby reducing the temperature distribution of the working fluid to be introduced from the cooler into a second cylinder. As a result, the exhaust heat recovery apparatus can be installed in, for example, the exhaust passage of the internal combustion engine and the exhaust passage of factory exhaust heat as restraining reduction in exhaust heat recovery efficiency.

An exhaust heat recovery apparatus according to another aspect of the present invention includes a first cylinder; a second cylinder; a first piston and a second piston, which make reciprocating motion in the first cylinder and the second cylinder; a heat exchanger including a heater connected to the first cylinder, a regenerator connected to the heater, and a cooler connected to the regenerator and the second cylinder; and a crank shaft connected to the first piston and the second piston with a connecting rod, and converting the reciprocating motion into rotational motion, wherein the exhaust heat recovery apparatus is installed in a heat medium passage so that the heater is arranged in the heat medium passage which has a device installing surface and through which a heat medium passes, and that the device installing surface and a rotation axis of the crank shaft become parallel.

This exhaust heat recovery apparatus is installed in the heat medium passage so that the device installing surface formed in the heat medium passage is in parallel to a rotation axis of a crank shaft. Due to the above-described structure, the pipe lengths of the cooler become the same and the pipe lengths of the regenerator become the same, thereby reducing the temperature distribution of the working fluid to be introduced from the cooler into the second cylinder. As a result, the exhaust heat recovery apparatus can be installed in, for example, the exhaust passage of the internal combustion engine and the exhaust passage of factory exhaust heat as restraining reduction in exhaust heat recovery efficiency.

An exhaust heat recovery apparatus according to still another aspect of the present invention includes a first cylinder; a second cylinder; a first piston and a second piston, which make reciprocating motions in the first cylinder and the second cylinder; a heat exchanger including a heater connected to the first cylinder, a regenerator connected to the heater, and a cooler connected to the regenerator and the second cylinder; and a crank shaft connected to the first piston and the second piston with a connecting rod, and converting reciprocating motion into rotational motion, wherein the exhaust heat recovery apparatus is installed in a heat medium passage so that the heater is arranged in the heat medium passage through which a heat medium passes, and that a central axis of the heat medium passage and a rotation axis of the crank shaft become parallel.

This exhaust heat recovery apparatus is installed in the heat medium passage so that a central axis of the heat medium passage is in parallel to the rotation axis of the crank shaft. Due to the above-described structure, the pipe lengths of the cooler become the same and the pipe lengths of the regenerator become the same, thereby reducing the temperature distribution of the working fluid to be introduced from the cooler into the second cylinder. As a result, the exhaust heat recovery apparatus can be installed in, for example, the exhaust passage of the internal combustion engine and the exhaust passage of factory exhaust heat as restraining reduction in exhaust heat recovery efficiency.

In the exhaust heat recovery apparatus according to the present invention, the first cylinder is positioned at an upstream side of a direction of heat medium flow.

Furthermore, this exhaust heat recovery apparatus, which has the structure of the above-described exhaust heat recovery apparatus, is installed in the heat medium passage with a first cylinder to be connected to the heater being arranged at an upstream side on a heat source medium. Due to the above-described structure, the pipe lengths of the cooler become the same and the pipe lengths of the regenerator become the same, thereby reducing the temperature distribution of the working fluid to be introduced from the cooler into the second cylinder. Also, since the working fluid heated by the heat source medium with high temperature is introduced in the first cylinder, exhaust heat recovery efficiency increases. As a result, the exhaust heat recovery apparatus can be installed in, for example, the exhaust passage of the internal combustion engine and the exhaust passage of factory exhaust heat as restraining reduction in exhaust heat recovery efficiency.

An exhaust heat recovery apparatus according to still another aspect of the present invention includes a first cylinder; a second cylinder; a first piston and a second piston, which make reciprocating motions in the first cylinder and the second cylinder; a heat exchanger including a heater connected to the first cylinder, a regenerator connected to the heater, and a cooler connected to the regenerator and the second cylinder; and a crank shaft connected to the first piston and the second piston with a connecting rod, and converting reciprocating motion into rotational motion, wherein the exhaust heat recovery apparatus is installed in a heat medium passage so that the heater is arranged in the heat medium passage through which a heat medium passes, and that the first cylinder is arranged at an upstream side of a heat medium flow direction and the second cylinder is arranged at a downstream side of the heat medium flow direction.

This exhaust heat recovery apparatus is installed in the heat medium passage with the first cylinder to be connected to the heater being arranged at the upstream side on the heat source medium. Accordingly, since the working fluid heated by the heat source medium with high temperature is introduced in the first cylinder, exhaust heat recovery efficiency increases. Also, the second cylinder to be coupled with the cooler is arranged at a downstream side of the first cylinder, which facilitates to provide a preferable design for restraining the pressure loss of the heat source medium. As a result, when recovering the exhaust heat of the internal combustion engine, by diminishing the effect relative to exhaust pressure of the internal combustion engine, while restraining the synthetic thermal efficiency drop of the internal combustion engine and the exhaust heat recovery apparatus, the exhaust heat recovery apparatus can be installed in, for example, the exhaust passage of the internal combustion engine and the exhaust passage of the factory exhaust heat.

In the exhaust heat recovery apparatus according to the present invention, only the heater is arranged in the heat medium passage.

As such, an entire surface area of the heater capable of being arranged in the heat source medium passage can become larger, thereby improving exhaust heat recovery efficiency of the exhaust heat recovery apparatus.

In the exhaust heat recovery apparatus according to the present invention, the heater and the regenerator are arranged in the heat medium passage.

As such, the heater and the regenerator are arranged in the heat source medium passage, thereby providing space-saving effect for an installation site when installing the exhaust heat recovery apparatus in the heat source medium passage.

In the exhaust heat recovery apparatus according to the present invention, the first cylinder and the second cylinder are arranged in line.

As such, for the exhaust heat recovery apparatus in which the first cylinder and the second cylinder are arranged in line, if the heater is arranged in the heat medium passage, the pressure drop of the heat medium is reduced, and reduction in exhaust heat recovery efficiency can be restrained while restraining the effect of exhaust pressure relative to such as the internal combustion engine.

In the exhaust heat recovery apparatus according to the present invention, at least the first cylinder and the second cylinder are supported by a base, and the base is installed on an exhaust heat recovery object.

A base, which supports the first cylinder and the second cylinder as components of the exhaust heat recovery apparatus, becomes a position reference of each component of the exhaust heat recovery apparatus. As such, using the base as the position reference of the each component, accuracy of the relative position of the each component can be secured. Also, this base can be used as a reference when installing the exhaust heat recovery apparatus in an exhaust heat recovery object, thereby securing the accuracy of the exhaust heat recovery apparatus installation.

In the exhaust heat recovery apparatus according to the present invention, when the exhaust heat recovery apparatus is installed in a vehicle, the crank shaft is arranged almost in parallel to a vehicle floor, and output of the crank shaft is transmitted in a direction almost perpendicular to a vertical direction of the vehicle.

Due to the above-described structure, when the exhaust heat recovery apparatus is installed on the vehicle, a space in a vertical direction of the vehicle can be saved. Also, mountability of the exhaust heat recovery apparatus on the vehicle is improved.

The exhaust heat recovery apparatus according to the present invention is installed in the heat medium passage so that the device installing surface formed in the heat medium passage is in parallel to the heater connecting side end surface and the cooler connecting side end surface. Accordingly, the exhaust heat recovery apparatus can be installed in the exhaust passage of the internal combustion engine and the exhaust passage of factory exhaust heat as restraining reduction in exhaust heat recovery efficiency.

Also, the exhaust heat recovery apparatus according to the present invention is installed in the heat medium passage with the first cylinder to be connected to the heater being arranged at an upstream side on the heat source medium. Accordingly, since the working fluid heated by the heat source medium with high temperature is introduced in the first cylinder, exhaust heat recovery efficiency increases, and the exhaust heat recovery apparatus can be installed in, for example, the exhaust passage of the internal combustion engine and the exhaust passage of the factory exhaust heat.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the invention will be explained in detail below with reference to the accompanying drawings. Furthermore, the invention is not limited by the preferred embodiments explained herein. Also, components of the following preferred embodiments may include one that is apparent to those skilled in the art or practically identical to the components herein. Still further, the following explanation uses an example where the Stirling engine is used as the exhaust heat recovery apparatus for recovering the exhaust heat of the internal combustion engine; however, the exhaust heat recovery object is not limited to the internal combustion engine, and the invention can be employed in, for example, the exhaust heat recovery for a factory, a plant, or a power plant.

Figure 1:
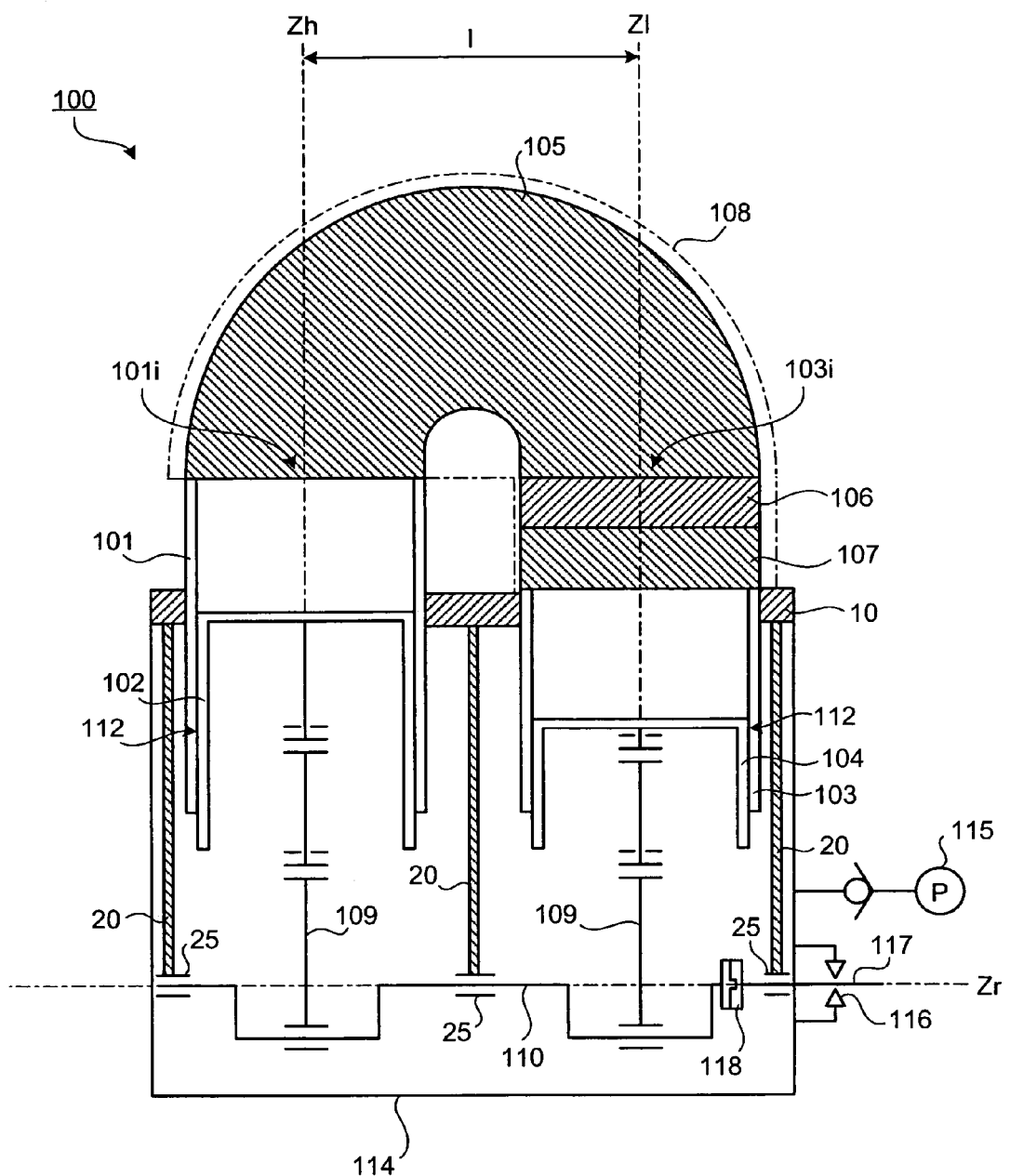
FIG. 1 is a cross-section view of a Stirling engine according to the present invention.
Figure 2:
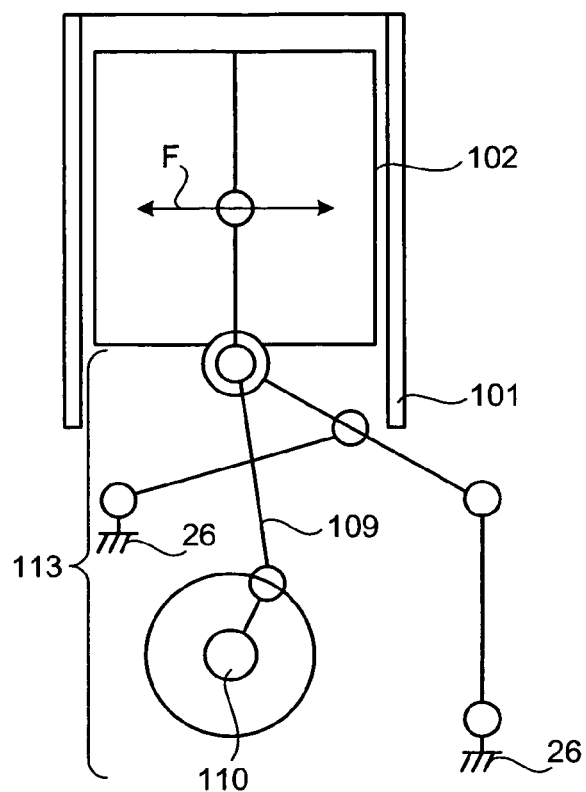
FIG. 2 is a cross-section view of a high temperature side piston viewing from a direction parallel to the crankshaft.
Figure 3:
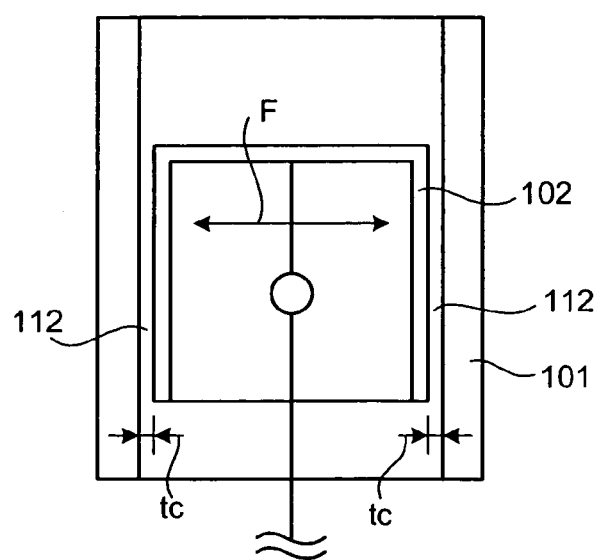
FIG. 3 is an explanatory view of an air bearing supporting the piston.

FIG. 1 is a cross-section view of the Stirling engine according to the present invention. FIG. 2 is a cross-section view of the high temperature side piston viewed from the direction parallel to the crank shaft. FIG. 3 is an explanatory view of an air bearing supporting the piston. The Stirling engine functioning as the exhaust heat recovery apparatus will be first explained. The Stirling engine 100 functioning as an exhaust heat recovery apparatus according to the present invention is so-called a type inline two-cylinder Stirling engine. Then, a high temperature side piston 102 functioning as a first piston housed in a high temperature side cylinder 101 functioning as a first cylinder and a low temperature side piston 104 functioning as a second piston housed in a low temperature side cylinder 103 functioning as a second cylinder are arranged in line.

The high temperature side cylinder 101 and the low temperature side cylinder 103 are supported on a base 10 functioning as a reference board. In the invention, this board 10 becomes a position reference of each component of the Stirling engine 100. As structuring such, accuracy of the relative position of the each component can be secured. Also, this board 10 has an advantage in that it can be used as a reference when the Stirling engine 100 is installed in, for example, the exhaust passage which is an exhaust heat recovery object. Accordingly, accuracy for installing the Stirling engine 100 can be secured.

The high temperature side cylinder 101 and the low temperature side cylinder 103 are connected with each other via a heat exchanger 108 including a heater 105, a regenerator 106, and a cooler 107. Here, one end of the heater 105 is connected to the high temperature side cylinder 101, and the other end thereof is connected to the regenerator 106. One end of the regenerator 106 is connected to the heater 105, and the other end thereof is connected to the cooler 107. One end of the cooler 107 is connected to the regenerator 106, and the other end thereof is connected to the low temperature side cylinder 103.

Also, working fluid (air in this example) is filled in the high temperature side cylinder 101, the low temperature side cylinder 103, and the heat exchanger 108, and the heat supplied from the heater 105 and the heat exhausted from the cooler 107 constitutes a Stirling cycle, thereby driving the high temperature side piston 102. Here, for example, the heater 105 and the cooler 107 can be configured to include a bundle of pipes made of material with high thermal conductivity and excellent heat resistance. Also, the regenerator 106 can be configured to include a porous heat reservoir. Furthermore, the heater 105, the cooler 107, and the regenerator 106 are not limited to those in this example, and appropriate structures may be selected according to, for example, the heat condition of the exhaust recovery object or specifications of the Stirling engine 100.

The high temperature side piston 102 and the low temperature side piston 104 are supported in the high temperature side cylinder 101 and the low temperature side cylinder 103 via an air bearing 112. In other words, this structure allows the piston to be supported in the cylinder without the piston ring. As such, friction between the piston and the cylinder is reduced, and heat efficiency of the Stirling engine 100 is improved. Also, reduction of the friction between the piston and the cylinder allows the Stirling engine 100 to be driven under, for example, the driving condition of low heat source and low temperature difference in the exhaust heat recovery of the internal combustion engine.

In order to form the air bearing 112, as shown in FIG. 3, a space tc between the high temperature side piston 102 and the high temperature side cylinder 101 is to be several tens of micrometers around the entire periphery of, for example, the high temperature side piston 102. Furthermore, the low temperature side piston 104 and the low temperature side cylinder 103 have the same structure. In order to realize the above-structure, in the invention, it is preferable that the high temperature side cylinder 101, the high temperature side piston 102, the low temperature side cylinder 103, and the low temperature side piston 104 be made from glass. Still further, the material is not limited to glass, and a high elastic modulus material such as ceramic may be used to make the high temperature side cylinder 101, the high temperature side piston 102, the low temperature side cylinder 103, and the low temperature side piston 104 or different materials may be combined. Also, easily processable metal may be used.

Here, the heater 105 of the heat exchanger 108 is positioned in a high temperature heat source to heat the working fluid flowing therein. Therefore, thermal expansion of the heat exchanger 108 comparing to the Stirling engine 100 becomes larger. Because of the thermal expansion, a center distance l between the central axis Zh of the high temperature side cylinder 101 and the central axis Zl of the low temperature side cylinder 103 becomes larger. Accordingly, the clearance between the cylinder and the piston cannot be maintained, and therefore the air bearing 112 may not function as expected.

In this embodiment according to the invention, the base 10 is arranged at inlet sides 101i and 103i of the working fluid of the high temperature side cylinder 101 and the low temperature side cylinder 103, and both cylinders are assembled on the base 10. Due to this structure, the high temperature side cylinder 101 and the low temperature side cylinder 103 are restricted and the increase of the center distance l is restrained. As a result, during the operation of the Stirling engine 100, when the temperature of the heater 105 becomes high, the clearance between the cylinder and the piston can be maintained to effectively function the air bearing 112.

A reciprocating motion of the high temperature side piston 102 and the low temperature piston 104 is transmitted to a crank shaft 110 via a connecting rod 109, and thus is converted into a rotational motion. As shown in FIG. 2, the connecting rod 109 is supported by a linear approximation mechanism 113, and the high temperature side piston 102 makes the reciprocating motion almost rectilinearly. this linear approximation mechanism 113 uses a grasshopper mechanism. Since supporting the connecting rod 109 by the linear approximation mechanism 113 makes a side force F (force directed in a radial direction of the piston) of the high temperature side piston 102 almost zero, the piston is sufficiently supported by the air bearing 112 with a small load-carrying capacity. The low temperature side piston 104 is also coupled with the crank shaft 110 following the same structure of the high temperature side piston 102.

As shown in FIG. 1, the crank shaft 110 is rotatably supported at a bearing 25 provided on a crank shaft support 20. The crank shaft support 20 is a plate member, which is fixed on the base 10. Also, a linear approximation mechanism 113 is supported by a linear approximation mechanism supporting portion 26 provided on the crank shaft support 20. At this time, the crank shaft support 20 is fixed on the base 10 independently from, i.e., without contacting, the high temperature side cylinder 101 and the low temperature side cylinder 103. Accordingly, the high temperature side cylinder 101 and the low temperature side cylinder 103 are not affected by vibration of the crank shaft 110 and the linear approximation mechanism 113 and thermal expansion of the crank shaft 110, thereby sufficiently securing the function of the air bearing 112.

As shown in FIG. 1, each component, such as the high temperature side cylinder 101, the high temperature side piston 102, the crank shaft 110, and the linear approximation mechanism 113, constituting the Stirling engine 100, is housed in a housing 114. Pressure means 115 pressurizes inside of the housing 114. This process is to generate as much output as possible from the Stirling engine 100 by pressuring the working fluid (air in this example) in the high and low temperature side cylinders 101 and 102 and the heat exchanger 108.

Also, in the invention, a seal bearing 116 is installed in the housing 114, and an output shaft 117 is supported by the seal bearing 116. The output shaft 117 and the crank shaft 110 are coupled via a flexible coupling 118, through which the output from the crank shaft 110 is transmitted toward the outside of the housing 114. Furthermore, in this embodiment, Oldham coupling is used as the flexible coupling 118.

Figure 4:
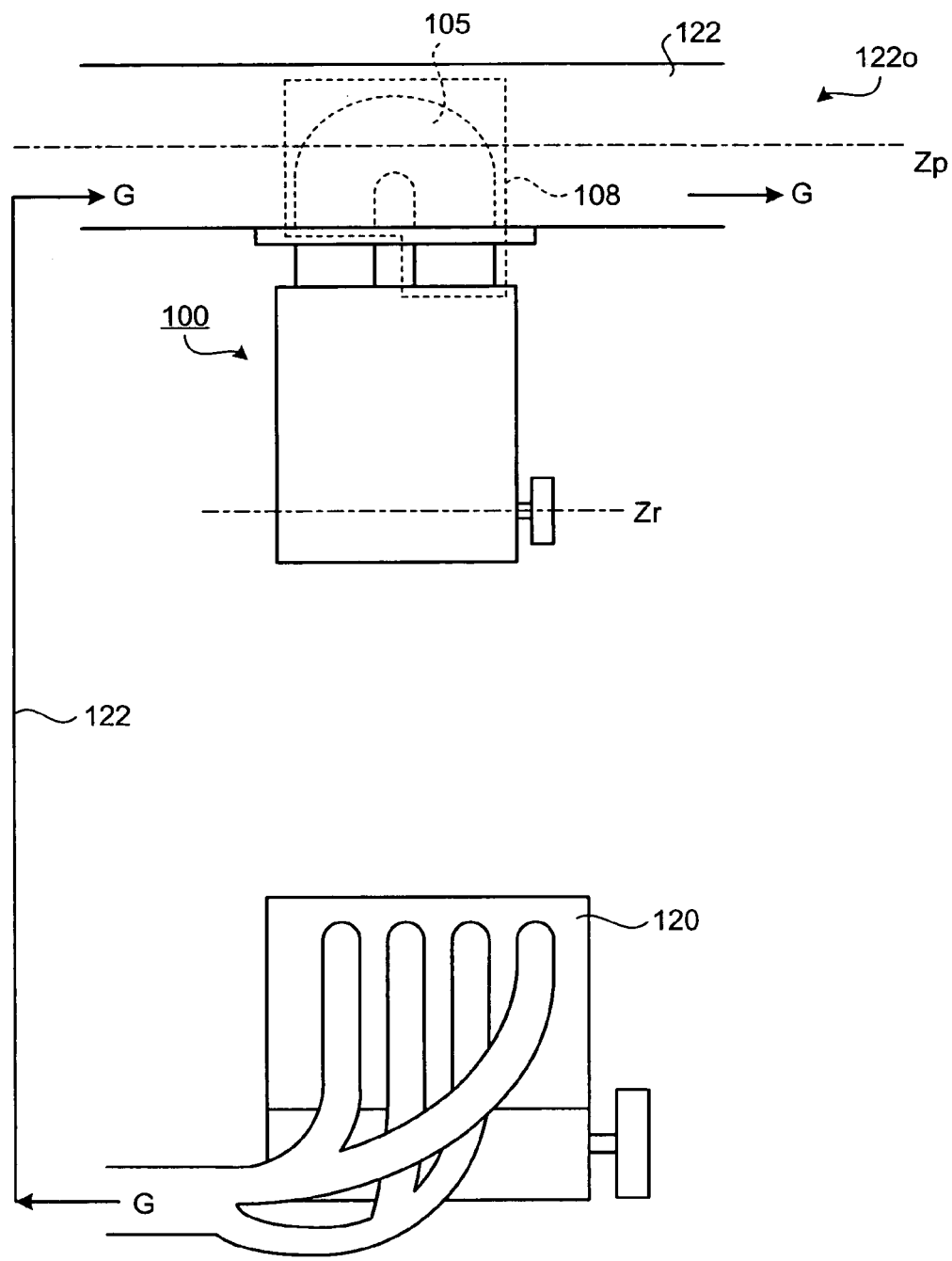
FIG. 4 is a schematic view of the condition where the Stirling engine is being installed in an exhaust passage of an internal combustion engine.
Figure 5:
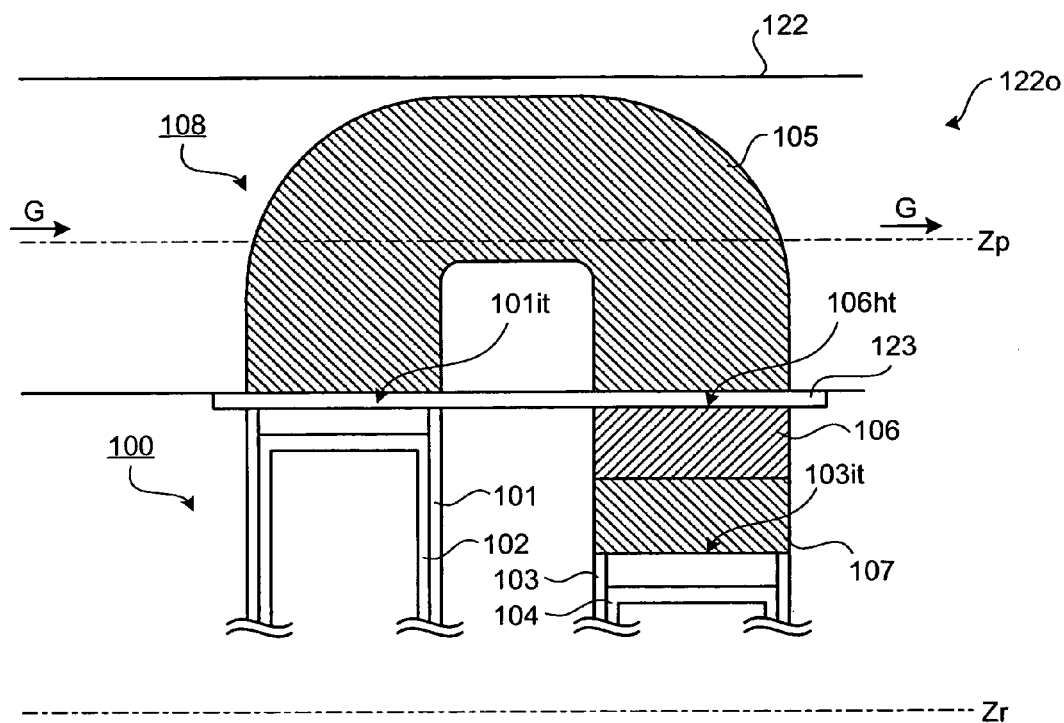
FIG. 5 is an explanatory view of the relationship between the Stirling engine according to the present invention and the exhaust passage.
Figure 6:
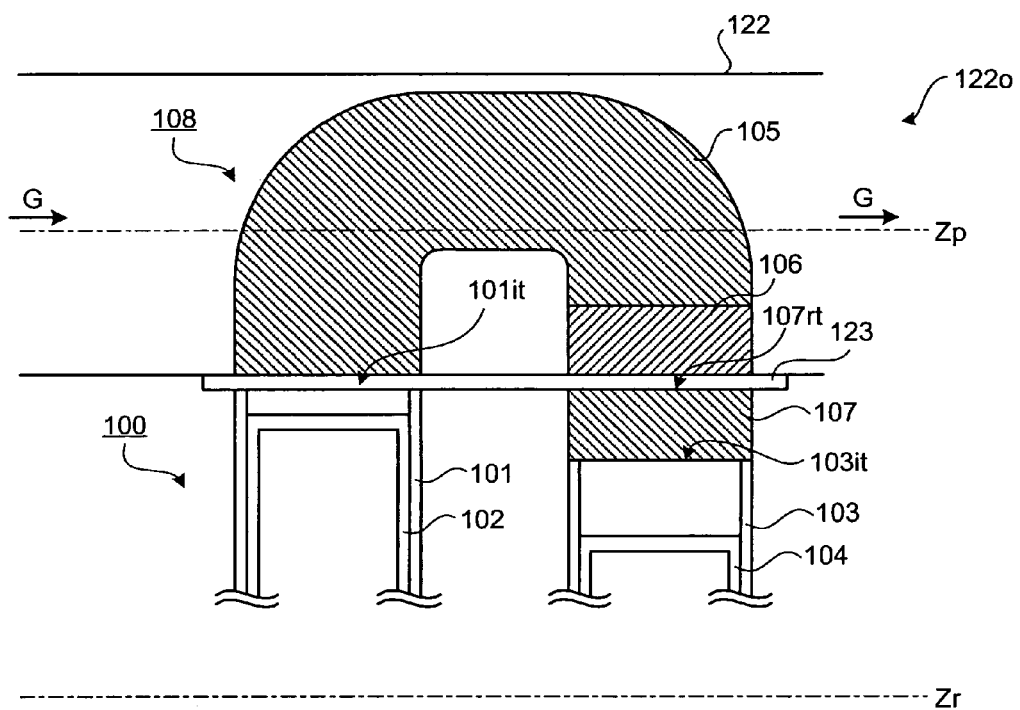
FIG. 6 is an explanatory view of the relationship between the Stirling engine according to the present invention and the exhaust passage.

FIG. 4 is a schematic view of the condition where the Stirling engine is being installed in the exhaust passage of the internal combustion engine. FIGS. 5 and 6 are explanatory views of the relationship between the Stirling engine according to the invention and the exhaust passage. As the Stirling engine 100 functioning as the exhaust heat recovery apparatus for the exhaust heat recovery of the internal combustion engine is used, as shown in FIG. 4, at least the heater 105 of the heat exchanger 108 equipped in the Stirling engine 100 is positioned in, for example, the exhaust passage 122 of the internal combustion engine 120 such as a gasoline engine and a diesel engine. Accordingly, the heater 105 of the heat exchanger 108 recovers heat energy from exhaust G as a heat medium, of the internal combustion engine 120. The exhaust passage 122 of the internal combustion engine 120 corresponds to the heat medium passage in the invention.

Here, when only the heater 105 is arranged in the exhaust passage 122 (as shown in FIG. 5), a distance between a heater connecting side end surface 101it of the high temperature side cylinder 101 and a heater side end surface 106ht of the regenerator 106 in a direction perpendicular to the respective surfaces should be as short as possible, and both end surfaces are preferably in a single plane. If only the heater 105 is arranged in the exhaust passage 122, an entire surface area of the heater 105 capable of being arranged in the exhaust passage 122 can be enlarged, thereby improving exhaust heat recovery efficiency. The working fluid heated by the heater 105 is introduced from the heater connecting side end surface 101it.

If the heater connecting side end surface 101it is flush with the end surface 106ht at the heater side of the regenerator 106, the heater 105 can be arranged in the exhaust passage 122 efficiently, thereby improving exhaust heat recovery efficiency. Also, velocity distribution and temperature distribution of the working fluid introduced in the high temperature side cylinder 101 become unified easily. Accordingly, reduction of heat efficiency of the Stirling engine 100 may be restrained. Here, the term "single plane" not only means the same plane where the heater connecting end surface 101it and a heater side end surface 106ht of the regenerator 106 are placed but also includes manufacturing tolerance range (same can be said hereafter).

Also, as shown in FIG. 6, depending upon an outside environment of the exhaust passage 122 and conditions such as the Stirling engine arrangement, the regenerator 106 may be arranged in the exhaust passage 122. Accordingly, the heater 105 and the regenerator 106 are arranged in the exhaust passage 122, thereby providing the space saving effect for installing the Stirling engine 100. At this time, a distance between the heater connecting side end surface 101it of the high temperature side cylinder 101 and a regenerator side end surface 107rt of the cooler 107 in a direction perpendicular to the respective surfaces should be as short as possible, and both surfaces are preferably in a single plane. If the heater connecting side end surface 101it and the regenerator side end surface 107rt of the cooler 107 are in the single plane, the heater 105 and the regenerator 106 can be arranged in the exhaust passage 122 effectively, thereby improving exhaust heat recovery efficiency.

The cooler 107 of the heat exchanger 108 is arranged between the low temperature side cylinder 103 of the Stirling engine 100 and the exhaust passage 122. The above-described structure makes the lengths of the pipes of the cooler 107 the same and allows a straight piping structure of the cooler 107. As a result, the temperature distribution of the working fluid to be introduced in the low temperature side cylinder 103 can be reduced and the pressure loss of the working fluid due to the cooler 107 can be restrained, thereby restraining the reduction in exhaust heat recovery efficiency of the Stirling engine 100 caused thereby.

The exhaust passage 122 and the Stirling engine 100 are installed via a device installing surface 123 provided in the exhaust passage 122. At this time, the Stirling engine is installed in the exhaust passage 122 so that the device installing surface 123, the heater connecting end surface 101it of the high temperature side cylinder 101, and the cooler connecting end surface 103it of the low temperature side cylinder 103 become parallel. Alternatively, the Stirling engine 100 can be installed in the exhaust passage 122 so that the device installing surface 123 and a rotation axis Zr of the crank shaft become parallel or a central axis Zp of the exhaust passage 122 and the rotation axis Zr of the crank shaft become parallel. Accordingly, the Stirling engine 100 can easily be installed in the exhaust passage 122 without an additional major design change to the existing exhaust passage. As a result, the heat exchanger 108 of the Stirling engine 100 can be mounted on the exhaust passage 122 without damaging the performance, mountability, and functions such as regarding noise of the body of the internal combustion engine 120 which is subject to exhaust heat recovery. Also, when installing the Stirling engine 100 with an identical specification in a different exhaust passage, only specification of the heat exchanger 108 needs to be changed to correspond, thereby increasing flexibility.

Figure 7:
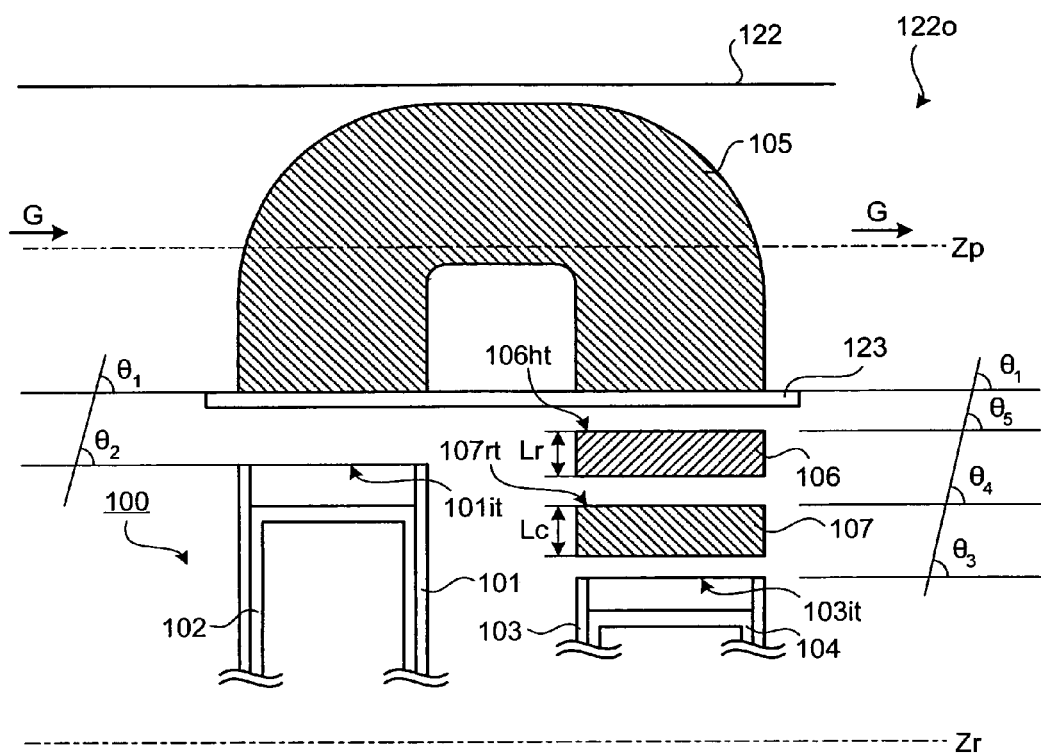
FIG. 7 is an exploded view of an installation structure between the Stirling engine according to the present invention and the exhaust passage.
Figure 8:
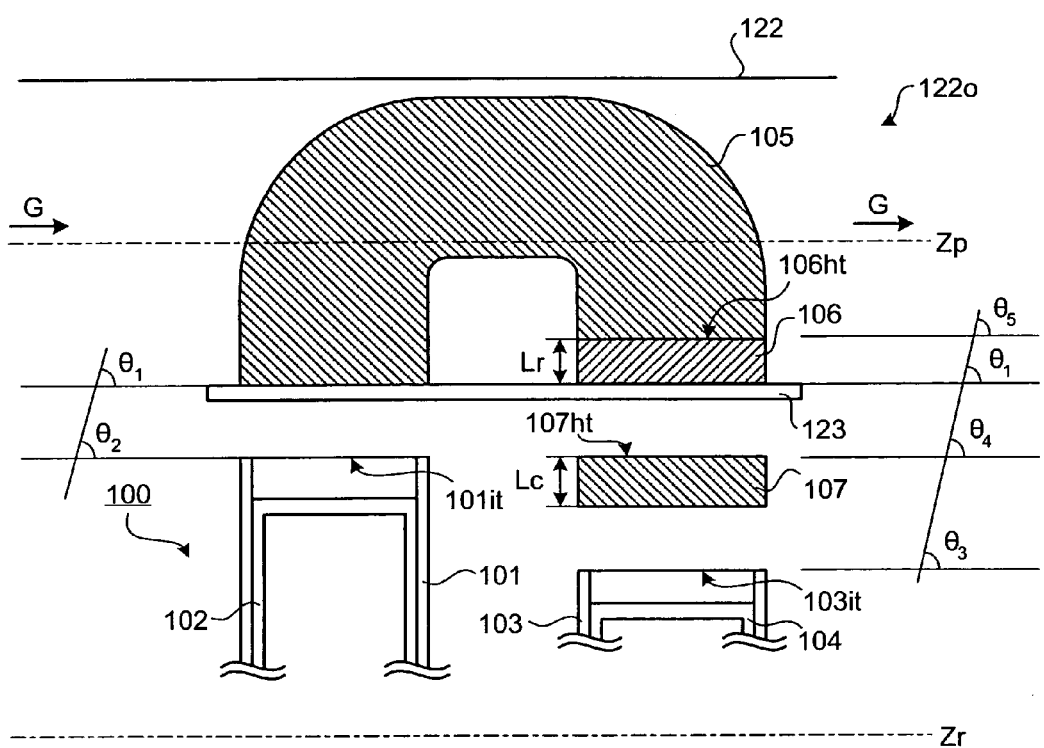
FIG. 8 is an exploded view of an installation structure between the Stirling engine according to the present invention and the exhaust passage.

FIGS. 7 and 8 are the exploded views of an installation structure between the Stirling engine according to the invention and the exhaust passage. As shown in FIG. 7, the Stirling engine 100 is installed on the device installing surface 123 so that the device installing surface 123 formed in the exhaust passage 122 is in parallel to the heater connecting side end surface 101it at the high temperature side cylinder 101 and the cooler connecting end surface 103it of the low temperature side cylinder 103. That is, in FIGS. 7 and 8, $\theta_1=\theta_2=\theta_3$. As such, the pipe lengths Lc of the cooler 107 become the same and the pipe lengths Lr of the regenerator 106 becomes the same. At this time, the regenerator side end surface 107rt of the cooler 107 and the heater side end surface 106ht of the regenerator 106 are preferably in parallel to the device installing surface 123 ($\theta_1=\theta_4=\theta_5$).

Arranging the members as above would reduce the temperature distribution of the working fluid introduced in the low temperature side cylinder 103, thereby restraining the reduction in heat efficiency of the Stirling engine 100 caused by the temperature distribution of the working fluid and restraining reduction in exhaust heat recovery efficiency. Furthermore, the condition of the term "parallel" not only means the condition of completely parallel but also includes allowable manufacturing tolerance range (same can be said hereinafter). In addition, same effects and advantages offered by the above-described structure can be obtained when the Stirling engine 100 is installed so that the device installing surface 123 and the rotation axis Zr of the crank shaft become parallel or the central axis Zp of the exhaust passage 122 and the rotation axis Zr of the crank shaft become parallel.

Also, the high temperature side cylinder 101 and the high temperature side piston 102 are arranged at the upstream side of the flow of the exhaust G, i.e., at the internal combustion 120 side of the exhaust passage 122. Then, the low temperature side cylinder 103 and the low temperature side piston 104 are arranged at the downstream side of such as the high temperature side cylinder 101, i.e., at the outlet 122o side of the exhaust passage 122. Due to this structure, the working fluid heated by high temperature exhaust is introduced in the high temperature side cylinder 101, thereby improving exhaust heat recovery efficiency. As a result, heat efficiency of the Stirling engine 100 can be improved. Also, devices such as the low temperature side cylinder 103 is arranged at the downstream side of such as the high temperature side cylinder 101, designing preferable for restraining the exhaust pressure loss is facilitated. This reduces the effect on the exhaust pressure of the internal combustion engine 120 and restrains reduction of the performance. As a result, overall heat efficiency of the internal combustion engine 120 and the Stirling engine 100 can be improved. The working fluid cooled by the cooler 107 can be introduced from the cooler connecting side end surface 103it.

Figure 9:
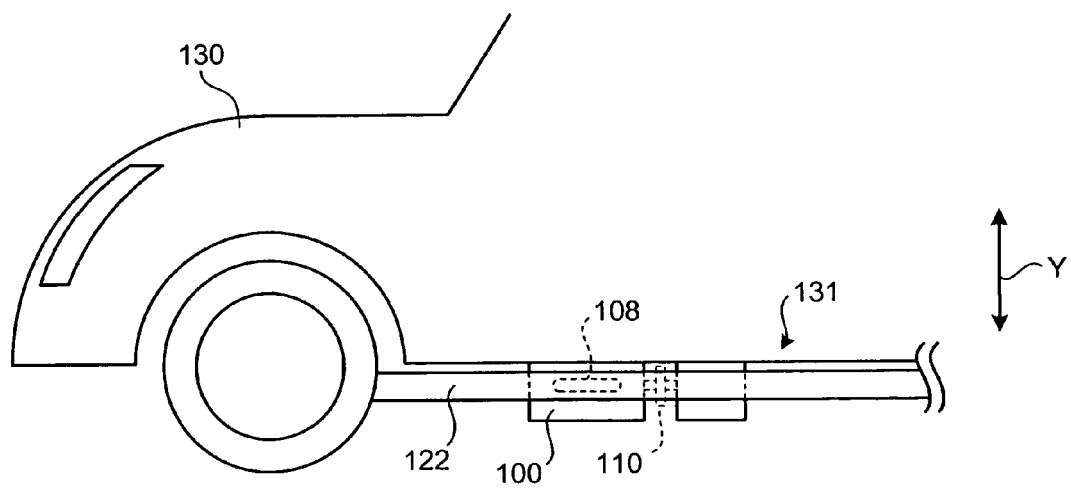
FIG. 9 is an explanatory view of an example in which the Stirling engine according to the present invention is being installed under a floor of the vehicle.
Figure 10:
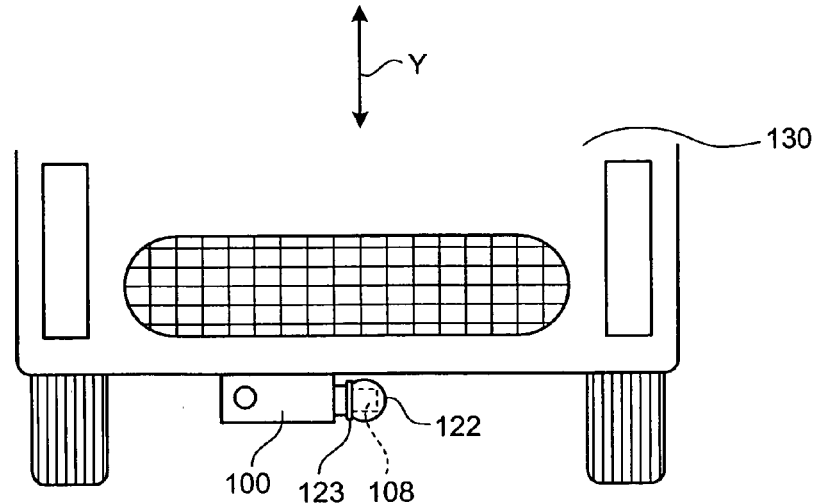
FIG. 10 is an explanatory view of an example in which the Stirling engine according to the present invention is being installed under a floor of the vehicle.
Figure 11:
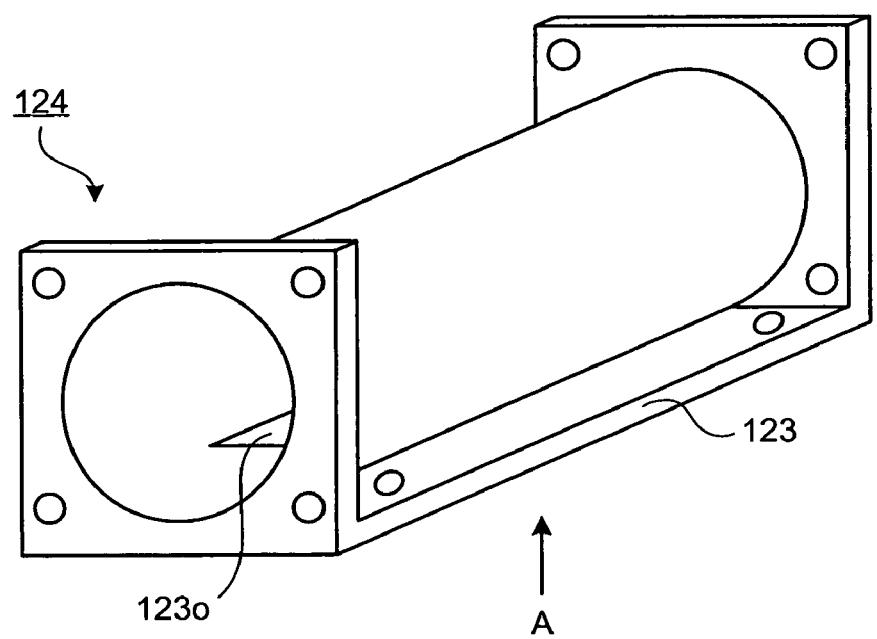
FIG. 11 is an explanatory view of an example of the installation structure between the Stirling engine according to the present invention and the exhaust passage.

FIGS. 9 and 10 are the explanatory views of the example in which the Stirling engine according to the invention is being installed under the floor of the vehicle. In the straight α-type Stirling engine, as described above, an arrangement direction of the high temperature side cylinder 101 and the low temperature side cylinder 103 is parallel to the rotation axis Zr of the crank shaft 110 (see FIG. 1). Accordingly, if the low temperature side cylinder 103 is positioned at the downstream side of the device such as the high temperature side cylinder 101, the device installing surface 123 and the crank shaft 110 become parallel. Therefore, when the Stirling engine 100 is installed in the exhaust passage 122 arranged under the floor 131 of the vehicle 130, the crank shaft 110 functioning as the output shaft of the Stirling engine 100 is arranged almost in parallel to the floor 131 of the vehicle 130. In other words, the crank shaft 110 becomes almost orthogonal to a vertical direction (direction of an allow Y in the figures) of the vehicle 130. Accordingly, the output of the Stirling engine 100 is not transmitted in the vertical direction of the vehicle 130 but in an almost vertical direction (an arrow Y as appeared in FIG. 10) relative to the vertical direction of the vehicle 130, thereby providing space saving effect for the vertical direction of the vehicle. Also, the mountability on the vehicle 130 improves.

Figure 12:
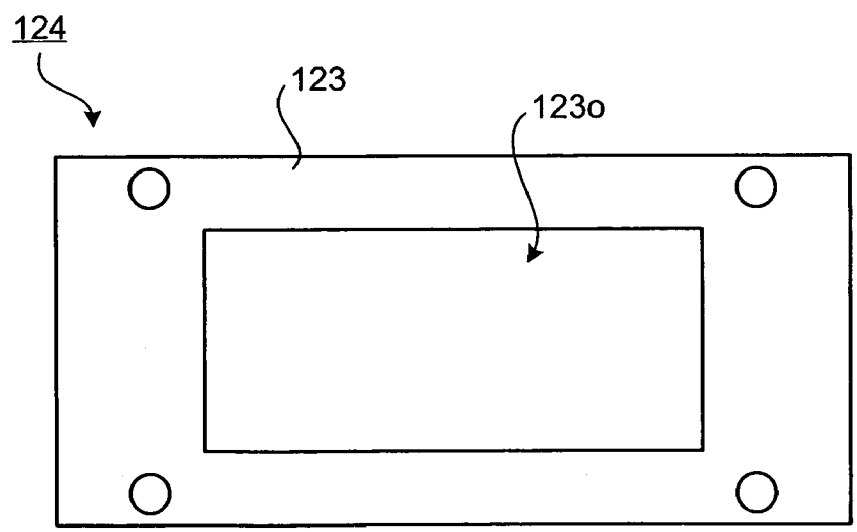
FIG. 12 is an explanatory view of an example of the installation structure between the Stirling engine according to the present invention and the exhaust passage.

FIGS. 11 to 17 are explanatory views of an example of the installation structure between the Stirling engine according to the invention and the exhaust passage. In the installation structure example in FIG. 11, an exhaust heat recovery apparatus installing portion 124 of the Stirling engine 100 is interrupted in the middle of exhaust passage 122, and the Stirling engine 100 is installed on an exhaust heat recovery apparatus installing flange 123 (device installing surface 123) of the exhaust heat recovery apparatus installing portion 124. FIG. 12 is a view showing FIG. 11 viewed from an arrow A. As shown in FIG. 12, an opening 123o is formed on the exhaust heat recovery apparatus installing flange 123 so as to take the heat exchanger 108 of the Stirling engine 100 therein. The exhaust heat recovery apparatus installing portion 124 may be manufactured for example by molding.

Figure 13:
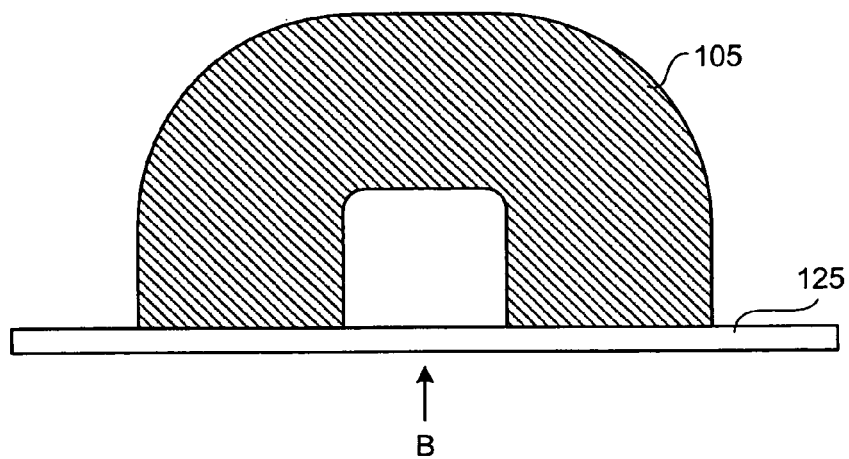
FIG. 13 is an explanatory view of an example of the installation structure between the Stirling engine according to the present invention and the exhaust passage.
Figure 14:
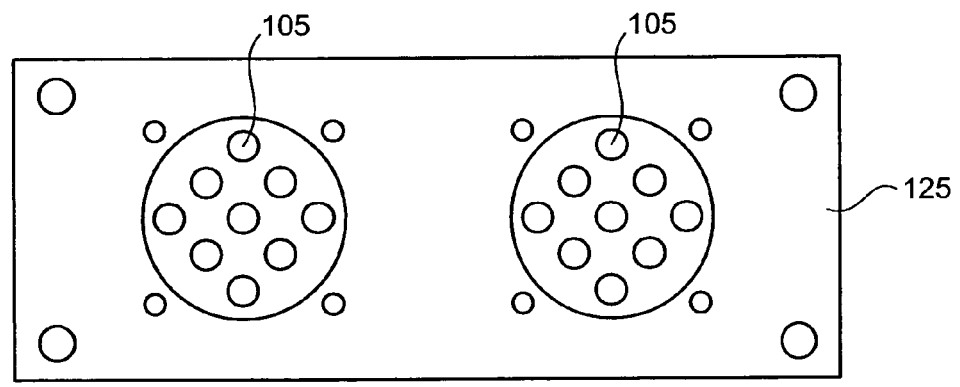
FIG. 14 is an explanatory view of an example of the installation structure between the Stirling engine according to the present invention and the exhaust passage.
Figure 15:
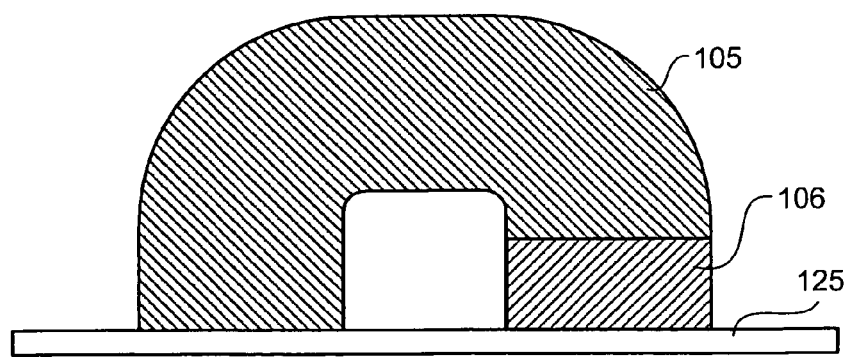
FIG. 15 is an explanatory view of an example of the installation structure between the Stirling engine according to the present invention and the exhaust passage.
Figure 16:
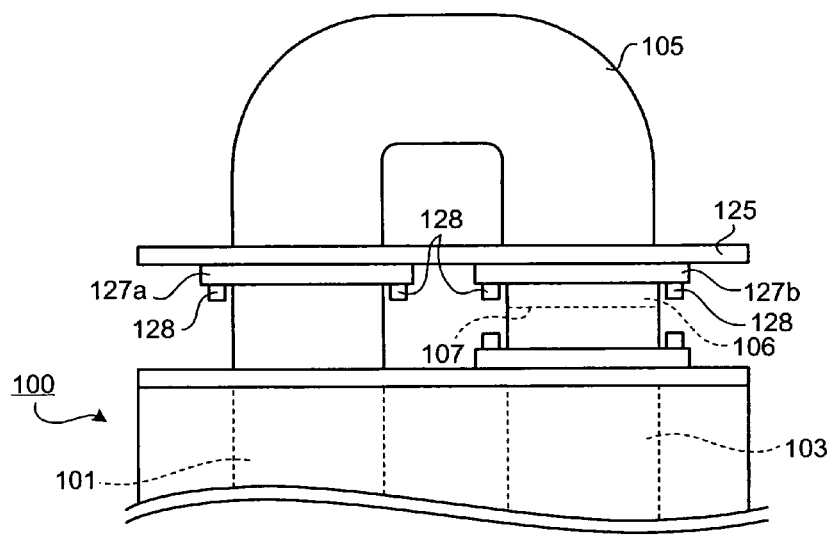
FIG. 16 is an explanatory view of an example of the installation structure between the Stirling engine according to the present invention and the exhaust passage.

As shown in FIGS. 13 and 14, the heater 105 of the heat exchanger 108 is installed on the heat exchanger installing flange 125. Here, FIG. 14 is a view showing FIG. 13 viewed from an arrow B. Furthermore, when the regenerator 106 is arranged in the exhaust passage 122, the heater 105 and the regenerator 106 are installed on the heat exchanger installing flange 125. As shown in FIG. 16, a first coupling flange 127a is provided at an working fluid introducing side of the high temperature side cylinder 101 of the Stirling engine 100, i.e., at the heater 105 side. Also, the cooler 107 and the regenerator 106 are provided at the working fluid introducing side of the low temperature side cylinder 103, i.e., the cooler 107 side, and a second coupling flange 127b is provided at the heater coupling side of the regenerator 106.

Figure 17:
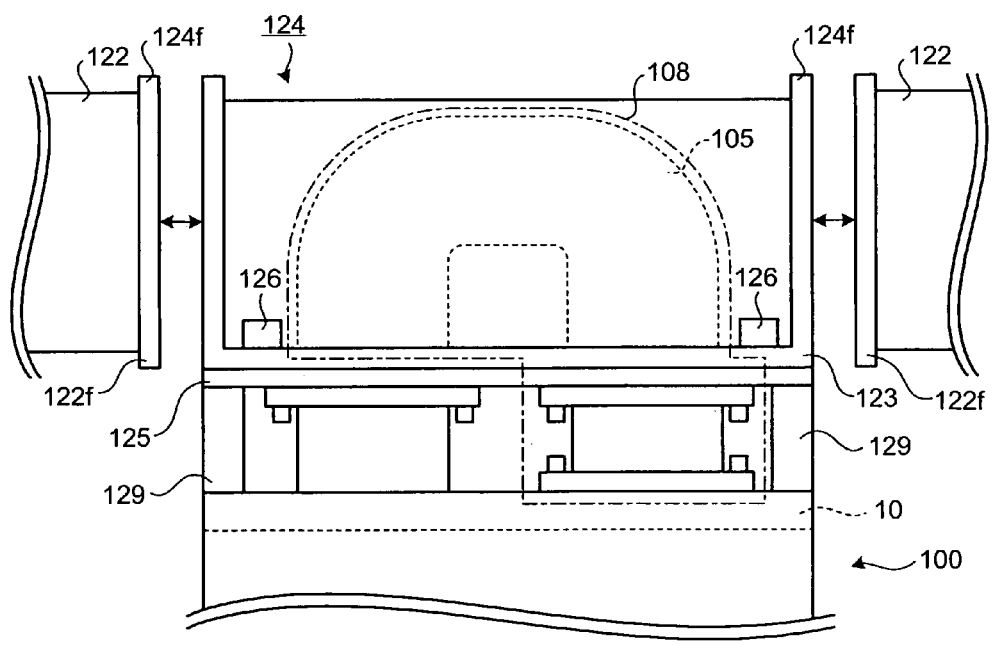
FIG. 17 is an explanatory view of an example of the installation structure between the Stirling engine according to the present invention and the exhaust passage.

As shown in FIG. 16, the heat exchanger installing flange 125 installing the heater 105 is fixed with the first and second flanges 127a, 127b by bolts 128. Then, as shown in FIG. 17, the heat exchanger installing flange 125 with at least the heater 105 provided thereat is fixed with the exhaust heat recovery installing flange 123 by bolts 126, and at least the heater 105 of the Stirling engine 100 is provided at the exhaust passage 122.

As such, the heat exchanger 108 is formed, and the Stirling engine 100 is installed in the exhaust passage 122. Also, a coupling member 129 is used between the base 10 of the Stirling engine 100 and the exhaust heat recovery apparatus installing flange 123 to couple with each other. Accordingly, the Stirling engine 100 can be fixed in the exhaust passage 122 more securely. Furthermore, if the coupling member 129 has a function as a reinforcement member, it can prevent from applying an excessive force against the high temperature side cylinder 101 and the cooler 107. Here, when the Stirling engine 100 is installed in the exhaust passage 122, the base 10 of the Stirling engine 100 preferably becomes an installation reference relative to the exhaust heat recovery apparatus installing flange 123. As such, the above-described relationship regarding the positions such as the exhaust heat recovery installing apparatus installing flange 123 (the device installing surface 123) and the heater connecting side end surface 101it of the high temperature side cylinder 101 can be determined accurately and easily. As a result, the installation of the Stirling engine 100 becomes easy and accuracy of the installation of the Stirling engine 100 improves. The exhaust heat recovery apparatus installing portion 124 with the Stirling engine installed therein is installed in the exhaust passage 122 by fixing an installing flange 124f provided thereat and an installing flange 122f provided at the exhaust passage 122. Also, the heat exchanger installing flange 125 may also be used as the base 10 of the Stirling engine 100. Still further, the heat recovery apparatus installing flange 123 may also be used as the base 10 of the Stirling engine 100.

As such according to the embodiments of the invention, when installing the exhaust heat recovery apparatus in the heat medium passage, the device installing surface formed on the heat medium passage becomes parallel to the heater connecting side end surface and the cooler connecting side end surface of the high temperature side cylinder and the low temperature side cylinder. Alternatively, the exhaust heat recovery apparatus is installed so that the device installing surface and the rotation axis of the crank shaft of the exhaust heat recovery apparatus become parallel or the central axis Zp of the exhaust passage and the rotation axis of the crank shaft of the exhaust heat recovery apparatus become parallel. Accordingly, the lengths of the pipes of the cooler become the same and the lengths of the pipes of the regenerator become the same, and therefore the temperature distribution and the velocity distribution of the working fluid introduced in the low temperature side cylinder can be reduced. As a result, the reduction in the heat efficiency of the exhaust heat recovery apparatus caused by the distribution of the temperature and the velocity of the working fluid can be restrained, thereby restraining reduction in exhaust heat recovery efficiency.

Also, the exhaust heat recovery apparatus is installed in the heat medium passage via the device installing surface, which facilitates the installation of the same in the heat medium passage.

Also, according to the embodiments of the invention, the high temperature side cylinder is positioned at the upstream side of the heat medium flow while the low temperature side cylinder is positioned at the downstream side of the high temperature side cylinder. Due to the arrangement as above, the working fluid heated by the heat medium with high temperature is introduced in the high temperature side cylinder, thereby improving exhaust heat recovery efficiency. Also, because the low temperature side cylinder is positioned at the downstream side of the high temperature side cylinder, preferable designing for restraining the heat medium pressure loss is facilitated. As a result, when recovering the exhaust heat from the internal combustion engine, the effect to the exhaust pressure can be reduced and the heat efficiency of the internal combustion engine and the overall exhaust heat recovery apparatus can be improved. As such, in the invention, reduction in exhaust heat recovery efficiency can be restrained and at the same time the heat medium pressure loss can be restrained, and therefore it is especially effective for the case where for example the heat medium temperature is relatively low when recovering the exhaust heat from the internal combustion.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An exhaust heat recovery apparatus comprising:
a first cylinder;
a second cylinder;
a first piston and a second piston, which make reciprocating motions in the first cylinder and the second cylinder;
a heat exchanger including a heater connected to the first cylinder, a regenerator connected to the heater, and a cooler connected to the regenerator and the second cylinder;
a crank shaft connected to the first piston and the second piston with a connecting rod, and converting reciprocating motion into rotational motion; and
a base supporting the first cylinder and the second cylinder,
wherein the exhaust heat recovery apparatus is installed in an exhaust passage so that the heater is arranged in the exhaust passage which has a device installing surface and through which an exhaust exhausted from an internal combustion engine passes, and that the device installing surface and a heater connecting end surface of the first cylinder become parallel and the device installing surface and the cooler connecting side end surface of the second cylinder become parallel.

2. The exhaust heat recovery apparatus according to claim 1, wherein the first cylinder is positioned at an upstream side of a direction of exhaust flow.

3. The exhaust heat recovery apparatus according to claim 1, wherein only the heater is arranged in the exhaust passage.

4. The exhaust heat recovery apparatus according to claim 1, wherein the heater and the regenerator are arranged in the exhaust passage.

5. The exhaust heat recovery apparatus according to claim 1, wherein the first cylinder and the second cylinder are arranged in line.

6. The exhaust heat recovery apparatus according to claim 5, wherein only the heater is arranged in the exhaust passage.

7. The exhaust heat recovery apparatus according to claim 5, wherein the heater and the regenerator are arranged in the heat medium passage.

8. An exhaust heat recovery apparatus comprising:
a first cylinder;
a second cylinder;
a first piston and a second piston, which make reciprocating motion in the first cylinder and the second cylinder;
a heat exchanger including a heater connected to the first cylinder, a regenerator connected to the heater, and a cooler connected to the regenerator and the second cylinder;
a crank shaft connected to the first piston and the second piston with a connecting rod, and converting the reciprocating motion into rotational motion; and
a base supporting the first cylinder and the second cylinder, wherein the exhaust heat recovery apparatus is installed in an exhaust passage so that the heater is arranged in the exhaust passage which has a device installing surface and through which an exhaust exhausted from an internal combustion engine passes, and that the device installing surface and a rotation axis of the crank shaft become parallel.

9. The exhaust heat recovery apparatus according to claim 8, wherein the first cylinder is positioned at an upstream side of a direction of exhaust flow.

10. The exhaust heat recovery apparatus according to claim 8, wherein only the heater is arranged in the exhaust passage.

11. The exhaust heat recovery apparatus according to claim 8, wherein the heater and the regenerator are arranged in the exhaust passage.

12. The exhaust heat recovery apparatus according to claim 8, wherein the first cylinder and the second cylinder are arranged in line.

13. The exhaust heat recovery apparatus according to claim 12, wherein only the heater is arranged in the exhaust passage.

14. The exhaust heat recovery apparatus according to claim 12, wherein the heater and the regenerator are arranged in the exhaust passage.

15. An exhaust heat recovery apparatus comprising:
a first cylinder;
a second cylinder;
a first piston and a second piston, which make reciprocating motions in the first cylinder and the second cylinder;
a heat exchanger including a heater connected to the first cylinder, a regenerator connected to the heater, and a cooler connected to the regenerator and the second cylinder;
a crank shaft connected to the first piston and the second piston with a connecting rod, and converting reciprocating motion into rotational motion; and
a base supporting the first cylinder and the second cylinder, wherein the exhaust heat recovery apparatus is installed in an exhaust passage so that the heater is arranged in the exhaust passage through which an exhaust exhausted from an internal combustion engine passes, and that a central axis of the exhaust passage and a rotation axis of the crank shaft become parallel.

16. The exhaust heat recovery apparatus according to claim 15, wherein the first cylinder is positioned at an upstream side of a direction of exhaust flow.

17. The exhaust heat recovery apparatus according to claim 15, wherein only the heater is arranged in the exhaust passage.

18. The exhaust heat recovery apparatus according to claim 15, wherein the heater and the regenerator are arranged in the exhaust passage.

19. The exhaust heat recovery apparatus according to claim 15, wherein the first cylinder and the second cylinder are arranged in line.

20. The exhaust heat recovery apparatus according to claim 19, wherein only the heater is arranged in the exhaust passage.

21. The exhaust heat recovery apparatus according to claim 19, wherein the heater and the regenerator are arranged in the exhaust passage.

22. An exhaust heat recovery apparatus comprising:
a first cylinder;
a second cylinder;
a first piston and a second piston, which make reciprocating motions in the first cylinder and the second cylinder;
a heat exchanger including a heater connected to the first cylinder, a regenerator connected to the heater, and a cooler connected to the regenerator and the second cylinder;
a crank shaft connected to the first piston and the second piston with a connecting rod, and converting reciprocating motion into rotational motion; and
a base supporting the first cylinder and the second cylinder, wherein the exhaust heat recovery apparatus is installed in an exhaust passage so that the heater is arranged in the exhaust passage through which an exhaust exhausted from an internal combustion engine passes, and that the first cylinder is arranged at an upstream side of an exhaust flow direction and the second cylinder is arranged at a downstream side of the exhaust flow direction.

23. The exhaust heat recovery apparatus according to claim 22, wherein only the heater is arranged in the exhaust passage.

24. The exhaust heat recovery apparatus according to claim 22, wherein the heater and the regenerator are arranged in the exhaust passage.

25. The exhaust heat recovery apparatus according to claim 22, wherein the first cylinder and the second cylinder are arranged in line.

26. The exhaust heat recovery apparatus according to claim 25, wherein only the heater is arranged in the exhaust passage.

27. The exhaust heat recovery apparatus according to claim 25, wherein the heater and the regenerator are arranged in the exhaust passage.

* * * * *